United States Patent
Tanaka

(10) Patent No.: US 8,570,825 B2
(45) Date of Patent: Oct. 29, 2013

(54) TEMPERATURE SENSOR, METHOD OF MANUFACTURING THE TEMPERATURE SENSOR, SEMICONDUCTOR DEVICE, METHOD OF MANUFACTURING THE SEMICONDUCTOR DEVICE, AND METHOD OF CONTROLLING THE SEMICONDUCTOR DEVICE

(75) Inventor: Yoshitsugu Tanaka, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 140 days.

(21) Appl. No.: 13/344,699

(22) Filed: Jan. 6, 2012

(65) Prior Publication Data

US 2012/0176835 A1    Jul. 12, 2012

(30) Foreign Application Priority Data

Jan. 12, 2011  (JP) ................... 2011-004342

(51) Int. Cl.
  *G11C 7/04*  (2006.01)
(52) U.S. Cl.
  USPC .. 365/211; 365/174; 365/185.19; 365/185.28
(58) Field of Classification Search
  USPC .................. 365/174, 211, 185.19, 185.28
  See application file for complete search history.

(56) References Cited

U.S. PATENT DOCUMENTS

2007/0286004 A1  12/2007  Kim et al.
2010/0195412 A1*  8/2010  Furutani et al. .......... 365/189.05

FOREIGN PATENT DOCUMENTS

| JP | 63-080546 | 4/1988 |
| JP | 03-195058 | 8/1991 |
| JP | 2003-532349 | 10/2003 |
| JP | 2007-134684 | 5/2007 |
| JP | 2010-192592 | 9/2010 |
| KR | 10-0505071 | 8/2005 |
| KR | 10-0816690 | 3/2008 |
| WO | WO 01/83238 A1 | 11/2001 |

* cited by examiner

*Primary Examiner* — Hoai V Ho
(74) *Attorney, Agent, or Firm* — IPUSA, PLLC

(57) ABSTRACT

A disclosed temperature sensor includes a charge trap structure including a silicon oxide film formed on a substrate; an aluminum oxide film that is formed on the silicon oxide film, wherein oxygen is injected into the aluminum oxide film from an upper surface thereof; and an electrode formed on the aluminum oxide film, wherein a flat band voltage of the charge trap structure is temperature dependent.

19 Claims, 6 Drawing Sheets

TEMPERATURE SENSOR, METHOD OF MANUFACTURING THE TEMPERATURE SENSOR, SEMICONDUCTOR DEVICE, METHOD OF MANUFACTURING THE SEMICONDUCTOR DEVICE, AND METHOD OF CONTROLLING THE SEMICONDUCTOR DEVICE

CROSS-REFERENCE TO RELATED APPLICATION

The present application is based upon and claims the benefit of priority of Japanese Patent Application No. 2011-004342, filed on Jan. 12, 2011, the entire contents of which are incorporated herein by reference.

BACKGROUND OF THE INVENTION

1. Field of the Invention

The present invention relates to a temperature sensor, a method of manufacturing the temperature sensor, a semiconductor device, a method of manufacturing the semiconductor device, and a method of controlling the semiconductor device.

2. Description of the Related Art

As an instrument to measure temperature, a thermistor or the like, which can output an electric signal corresponding to a measured temperature, is widely used in various electronic apparatuses. When a semiconductor device is used in an electronic apparatus, the electronic apparatus may be subject to a relatively strict temperature management or control, because properties of a semiconductor material that constitutes the semiconductor device are likely to change depending on temperature.

A semiconductor device in which the thermistor or the like is integrated in order to measure a temperature of the semiconductor device has been disclosed in Japanese Patent Application Laid-Open Publications Nos. S63-80546, H03-195058, and 2007-134684.

A temperature sensor based on the thermistor or the like is different in terms of its structure from a semiconductor device such as a semiconductor memory and a logic circuit. Specifically, different materials from those generally used to fabricate the semiconductor device need to used, and different processes from those generally performed to fabricate the semiconductor device need to be performed, in order to integrate such a temperature sensor on the same substrate from which the semiconductor device is fabricated. Therefore, the semiconductor device integrated with the temperature sensor tends to be expensive.

The present invention has been made in view of the above, and is directed to provide a compatible temperature sensor integrated in a semiconductor device such as a memory and a logic circuit at a low cost, and a method of manufacturing the temperature sensor. In addition, the present invention is directed to provide a semiconductor device in which the temperature sensor is integrated, a method of manufacturing the semiconductor device, and a method of controlling the semiconductor device.

According to a first aspect of the present invention, there is provided a temperature sensor comprising a charge trap structure including a silicon oxide film formed on a substrate; an aluminum oxide film that is formed on the silicon oxide film, wherein oxygen is injected into the aluminum oxide film from an upper surface thereof; and an electrode formed on the aluminum oxide film, wherein a flat band voltage of the charge trap structure is temperature dependent.

According to a second aspect of the present invention, there is provided a method of manufacturing a temperature sensor comprising steps of forming a silicon oxide film on a substrate; forming an aluminum oxide film on the silicon oxide film; injecting oxygen into the aluminum oxide film from an upper surface thereof; and forming an electrode on the aluminum oxide film to which the oxygen has been injected.

According to a third aspect of the present invention, there is provided a semiconductor device comprising: a semiconductor element area where a semiconductor element is formed, wherein the semiconductor element includes a charge trap structure including a silicon oxide film formed on a substrate; an aluminum oxide film that is formed on the silicon oxide film, wherein oxygen is injected into the aluminum oxide film from an upper surface thereof; and an electrode formed on the aluminum oxide film, and a temperature sensor area where the temperature sensor according to the first aspect is formed.

According to a fourth aspect of the present invention, there is provided a method of manufacturing a semiconductor device according to the third aspect. The method comprises steps of: forming a silicon oxide film on a substrate; forming an aluminum oxide film on the silicon oxide film; injecting oxygen selectively into the aluminum oxide film in the temperature sensor area; and forming an electrode on the aluminum oxide film in the temperature sensor area and the semiconductor element area.

According to a fifth aspect of the present invention, there is provided a method of controlling a semiconductor device according to the third aspect. The method comprises steps of: measuring a temperature in the temperature sensor area; determining whether the measured temperature is a predetermined temperature or greater; and performing one of cooling the semiconductor device and transferring data stored in the memory area of the semiconductor device to another device when determined affirmative in the step of determining.

According to a sixth aspect of the present invention, there is provided a method of controlling the semiconductor device according to the third aspect. The method comprises steps of measuring a temperature in the temperature sensor area; determining one of a pulse width and a voltage of a signal applied to the semiconductor element area in accordance with the measured temperature; and writing data into the semiconductor element area in accordance with one of the pulse width and the voltage determined in the step of determining.

DETAILED DESCRIPTION OF THE PREFERRED EMBODIMENTS

Figure 1:
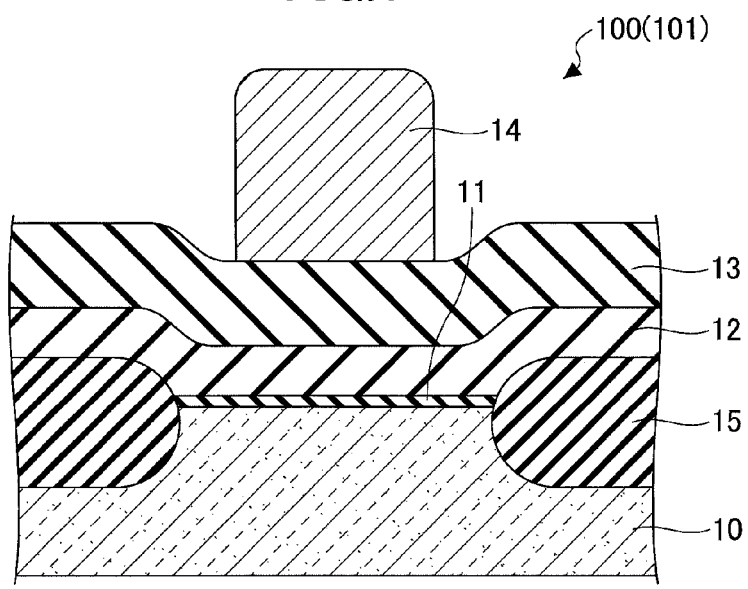
FIG. 1 is a cross-sectional view of a temperature sensor according to a first embodiment of the present invention.

According to an embodiment of the present invention, there are provided a compatible temperature sensor integrated in a semiconductor device such as a memory and a logic circuit at a low cost, a method of manufacturing the temperature sensor, a semiconductor device in which the temperature sensor is integrated, and a method of manufacturing the semiconductor device, and a method of controlling the semiconductor device.

Non-limiting, exemplary embodiments of the present invention will now be described with reference to the accompanying drawings. In the drawings, the same or corresponding reference symbols are given to the same or corresponding members or components. It is to be noted that the drawings are illustrative of the invention, and there is no intention to indicate scale or relative proportions among the members or components. Therefore, the specific size should be determined by a person having ordinary skill in the art in view of the following non-limiting embodiments.

First Embodiment

A Temperature Sensor

Referring to FIG. 1, a temperature sensor according to a first embodiment is explained.

A temperature sensor 100 according to this embodiment is provided with a silicon oxide film 11, a silicon nitride film 12, an aluminum oxide film 13, and an electrode 14 that are formed in this order on a silicon substrate 10 having an isolation region 15 formed of silicon oxide. This structure is generally called a charge trap structure, which basically serves as a charge trap memory. However, when oxygen injection, which may be performed by, for example, a gas cluster ion beam method, is performed with respect to the charge trap structure as explained later, the charge trap structure can serve as a temperature sensor.

Incidentally, instead of the silicon substrate 10, a germanium substrate, a gallium arsenide substrate, an indium phosphide substrate, a silicon carbide substrate, or a germanium silicon substrate may be used. In addition, an organic semiconductor made of, for example, poly-acethylene may be used. Moreover, a flexible substrate made of, for example, a flexible semiconductor material may be used as a substrate. Furthermore, a ball semiconductor or a semiconductor substrate having a three-dimensional structure may be used as a substrate.

The silicon oxide film 11 is formed by thermally oxidizing an upper layer of the silicon substrate 10, and has a thickness of about 2 nm.

The silicon nitride film 12 is deposited on the silicon oxide film 11 by a chemical vapor deposition method, and has a thickness of about 7 nm.

The aluminum oxide film 13 is deposited on the silicon nitride film 12 by a Chemical Vapor Deposition (CVD) method, and has a thickness of about 15 nm. After the aluminum oxide film 13 is deposited, oxygen is injected into the aluminum oxide film 13, for example, by an ion implantation method, in which oxygen ions are implanted into the aluminum oxide film 13 using an ion implantation apparatus, and a gas cluster ion beam (GCIB) method, in which oxygen gas clusters are irradiated onto the aluminum oxide film 13.

In addition, the electrode 14 is in a form of a film made of poly-silicon, electrically conductive metal nitride such as titanium nitride (TiN) and tantalum nitride (TaN), or metal such as tungsten (W) and platinum (Pt). In this embodiment, the electrode 14 is formed of TiN.

Incidentally, the silicon nitride film 12 corresponds to a charge trap film for stably retaining electric charge in a charge trap memory, and thus is formed in the case of the charge trap memory. However, the aluminum oxide film 13 may be formed directly on the silicon oxide film 11 without the silicon nitride film 12 in the temperature sensor 100 according to an embodiment of the present invention.

Figure 2:
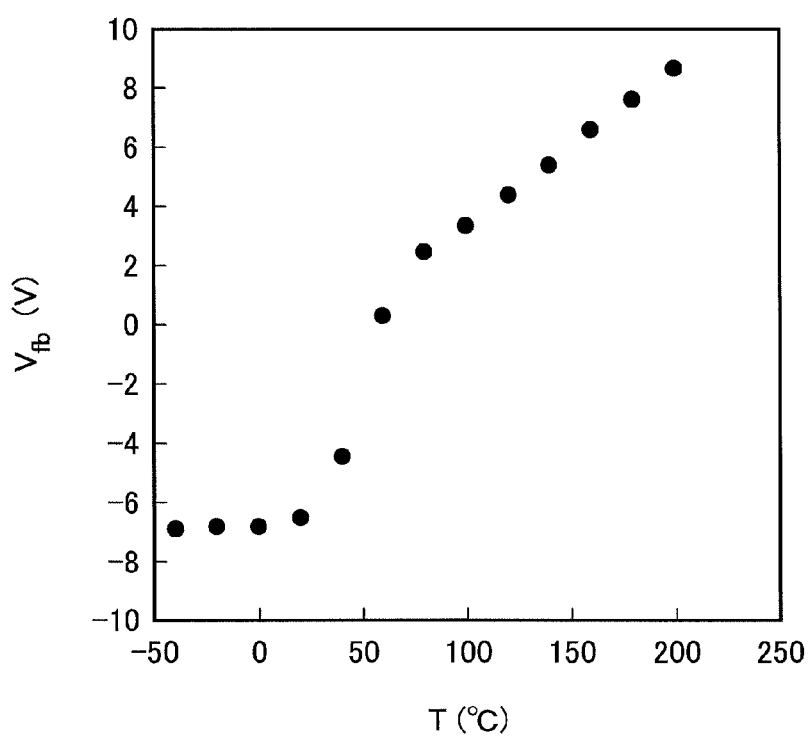
FIG. 2 illustrates a relationship between a flat band voltage and a temperature in the temperature sensor of FIG. 1.

FIG. 2 illustrates a relationship between a flat band voltage Vfb and temperature T of the temperature sensor 100 according to this embodiment. The flat band voltage Vfb is obtained by measuring an electric capacity of the charge trap structure (the temperature sensor 100) while applying a voltage across the gate electrode and the silicon substrate 10 so that there is no band bending in the temperature sensor 100. As shown in FIG. 2, while the flat band voltage Vfb is almost constant at about −7 V in a temperature range below about −50° C. and 20° C., the flat band voltage Vfb rapidly increases in a temperature range between 20° C. and 80° C. In addition, in a temperature range above 80° C., the flat band voltage Vfb increases substantially linearly as temperature is raised. Here, the relationship between the flat band voltage Vfb and the temperature T is expressed as $T=\alpha \times Vfb+\beta$ ($\alpha$ and $\beta$ are constant).

Utilizing the linear relationship between the flat band voltage Vfb and the temperature T, the temperature sensor 100 can measure a temperature. Incidentally, such a relationship is established by injecting oxygen into the aluminum oxide film from an upper surface thereof. In addition, it has been confirmed that the linear relationship shown in FIG. 2 is reproducible. For example, after a temperature is repeatedly raised and lowered, the same relationship is obtained. Moreover, while the relationship is illustrated in a temperature range between −50° C. and 250° C. in FIG. 2, such a linear relationship is obtained up to 500° C. Therefore, the temperature sensor 100 can measure a temperature from about 80° C. to about 500° C.

Therefore, the temperature sensor 100 can measure the flat band voltage Vfb and thus obtain a temperature corresponding to the measured flat band voltage Vfb. Specifically, in the temperature sensor 100, capacitance is measured while applying a voltage across the electrode 14 and the silicon substrate 10, thereby obtaining the flat band voltage Vfb, and the temperature is obtained in accordance with the flat band voltage Vfb relationship illustrated in FIG. 2.

Incidentally, while a temperature is obtained by measuring the flat band voltage Vfb in the temperature sensor 100, a temperature may be also obtained by measuring a threshold voltage Vth instead of the flat band voltage Vfb.

(Method of Manufacturing the Temperature Sensor)

Figure 3:
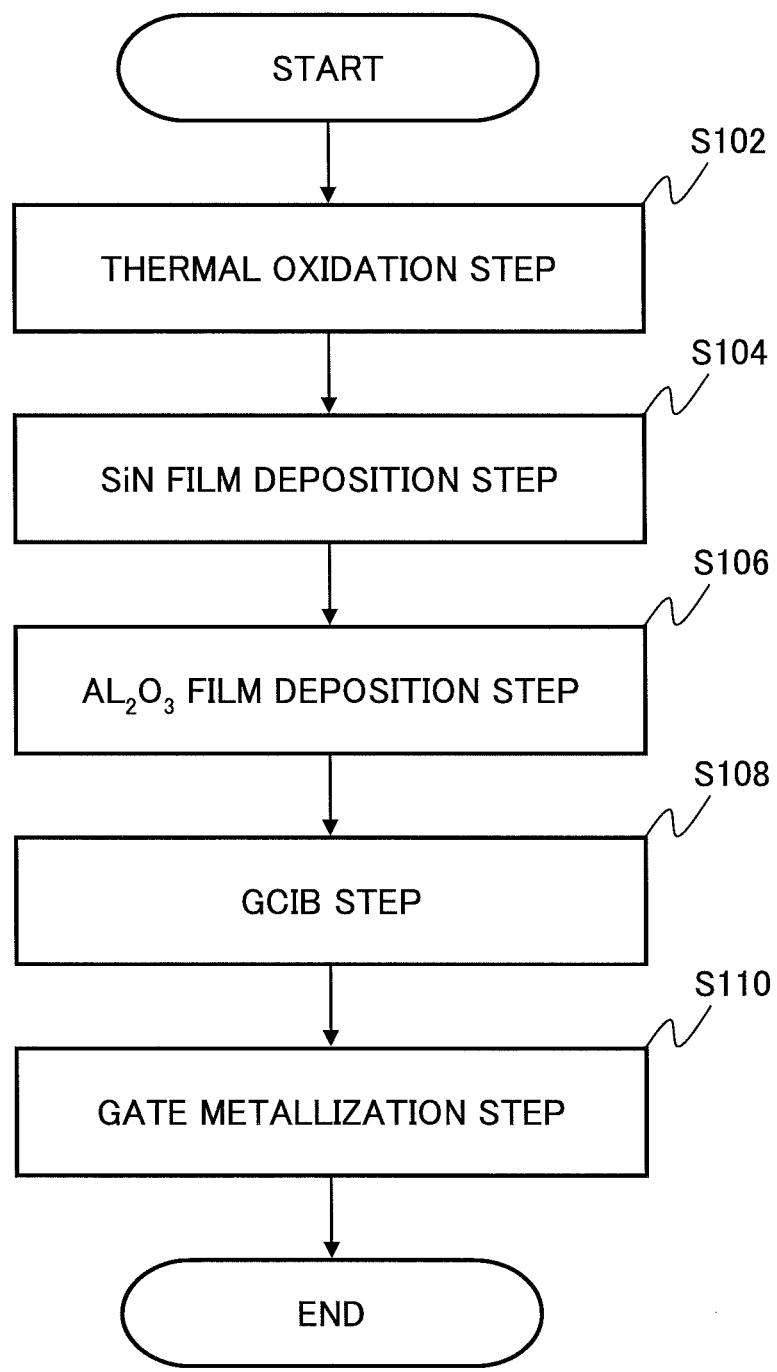
FIG. 3 is a flowchart illustrating a method of manufacturing the temperature sensor of FIG. 1.

Next, a method of manufacturing the temperature sensor is explained with reference to FIG. 3.

First, an upper surface layer of the silicon substrate 10 is thermally oxidized thereby forming the silicon oxide film 11 at Step S102.

Next, the silicon nitride film 12 is deposited on the silicon oxide film 11 by a CVD method at Step S104.

Next, the aluminum oxide film 13 is deposited on the silicon nitride film 12 by a CVD method at Step S106.

Next, oxygen is injected into the aluminum oxide film 13 from the upper surface thereof. Specifically, the oxygen injection is carried out by ion-implanting oxygen ions into the aluminum oxide film 13, employing an ion implantation apparatus, or by irradiating oxygen gas clusters onto the aluminum oxide film 13, employing a gas cluster ion beam apparatus. The oxygen gas clusters may be generated from any oxygen containing gas, but preferably oxygen gas.

Next, the electrode 14 is formed on the aluminum oxide film 13 at Step S110. The electrode 14 is composed of a TiN film and a W film in this embodiment.

With these procedures, the temperature sensor 100 according to the first embodiment is manufactured.

Incidentally, a thermal process may be performed after the oxygen injection step (S108), thereby to anneal the oxygen injected aluminum oxide film 13. In this case, an annealing temperature needs to be less than 500° C., because the oxygen injected aluminum oxide film 13 that is annealed at 500° C. or greater does not present the relationship shown in FIG. 2, which has been confirmed through the inventor's investigations.

In addition, the gas cluster ion beam irradiated onto the aluminum oxide film 13 may originate from an oxygen-containing gas. Specifically, oxygen gas, which is not diluted by a dilution gas, is preferably used. It should be noted here that the relationship shown in FIG. 2 is not obtained if a gas cluster ion beam generated from a gas containing no oxygen such as argon (Ar) gas is irradiated onto the aluminum oxide film 13.

Incidentally, the silicon nitride film 12 is not necessarily deposited on the silicon oxide film 11. In this case, the aluminum oxide film 13 is deposited on the silicon oxide film 11 at step S106, without performing step S104.

Second Embodiment

Semiconductor Device 20

Next, a semiconductor device 20 according to a second embodiment of the present invention is explained. The semiconductor device 20 includes the temperature sensor according to the first embodiment. Specifically, the semiconductor device 20 according to the second embodiment includes a charge trap memory and the temperature sensor whose structure is similar to a Metal Oxide Semiconductor (MOS) structure of the charge trap memory. The charge trap memory in the semiconductor device 20 can be manufactured in substantially the same procedures as those for the temperature sensor 100 according to the first embodiment, except for injecting oxygen into the aluminum oxide film 13 in the temperature sensor 100.

Figure 4:
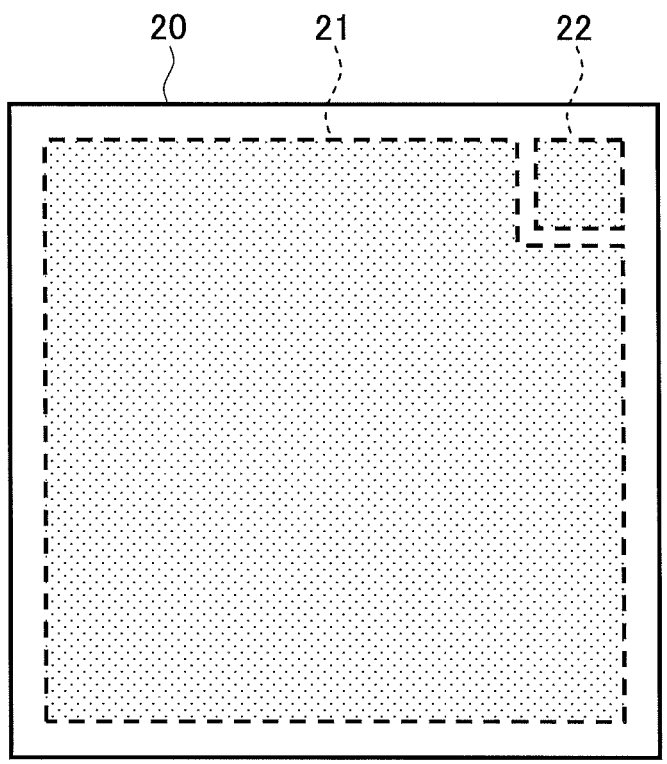
FIG. 4 is a top view of a semiconductor device according to a second embodiment of the present invention.

Referring to FIG. 4, a semiconductor device 20 according to the second embodiment includes a semiconductor element area (memory area) 21 where the charge trap type memories are formed and a temperature sensor area 22 where the temperature sensor according to the first embodiment is formed.

The charge trap memory in the memory area 21 of the semiconductor device 20 has substantially the same structure as shown in FIG. 1, which shows the temperature sensor 100 according to the first embodiment. A primary difference between the structures of the charge trap memory and the temperature sensor 100 is that oxygen is injected to the aluminum oxide film 13 of the temperature sensor 100 while oxygen is not injected to the aluminum oxide film 13 of the charge trap memory. Incidentally, the charge trap memory may be referred to as a charge trap memory 101 (FIG. 1), although a source area and a drain area are not illustrated in FIG. 1.

Incidentally, the silicon nitride film 12, which may be omitted in the temperature sensor 100 as explained above, may also be omitted in the charge trap memory 101. In this case, the aluminum oxide film 13 or a boundary between the aluminum oxide film 13 and the silicon oxide film 11 may serve as a charge trap film instead of the silicon nitride film 12. In addition, when the silicon nitride film 12 is omitted in the temperature sensor 100, the silicon nitride film 12 is preferably omitted also in the charge trap memory 101, in order to avoid an increased numbers of process steps required to form the silicon nitride film 12 only in the memory area 21.

(Method of Manufacturing the Semiconductor Device 20)

Figure 5:
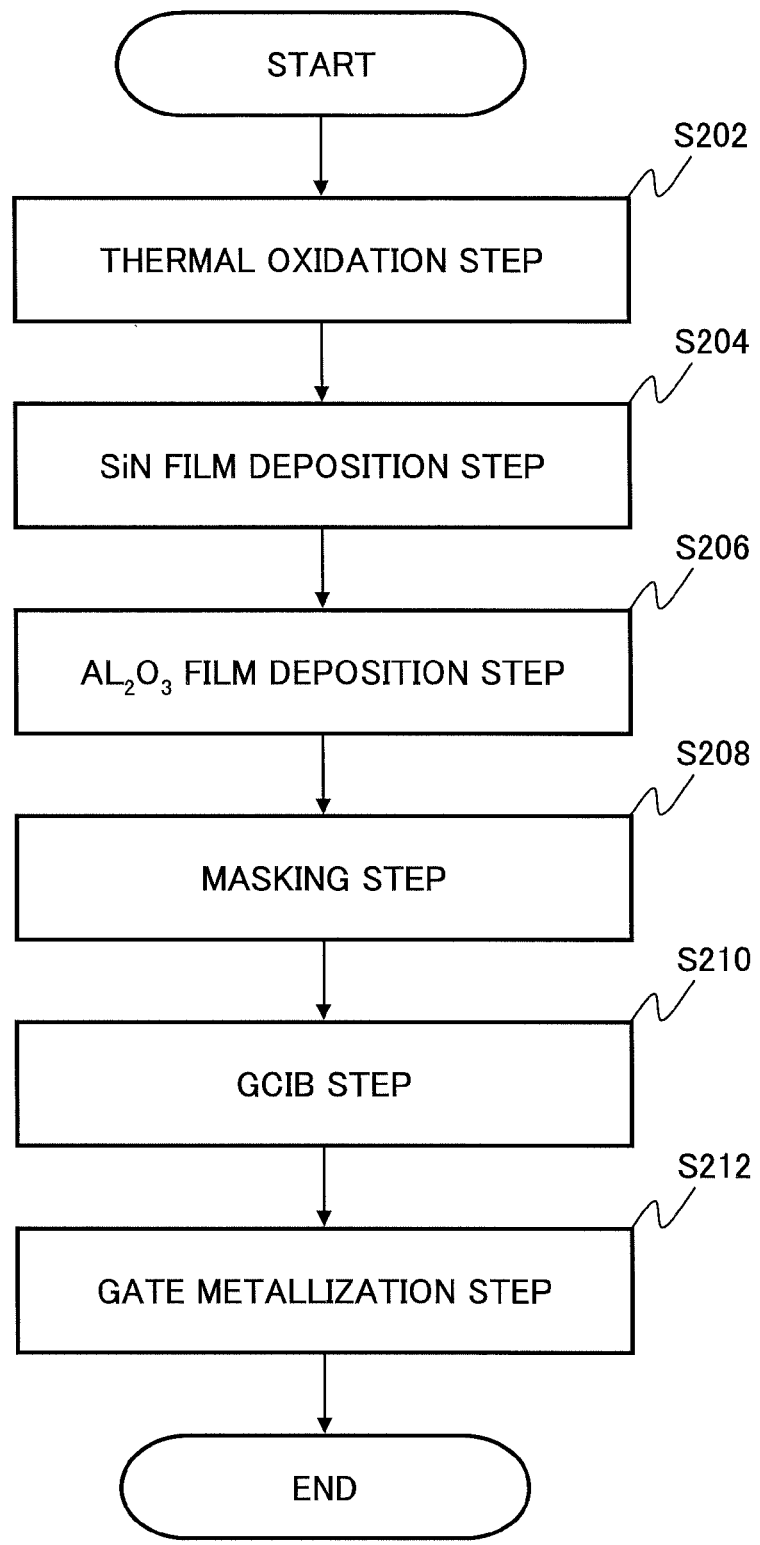
FIG. 5 is a flowchart illustrating a method of manufacturing the semiconductor device of FIG. 4.

Next, a method of manufacturing the semiconductor device 20 according to this embodiment is explained with reference to FIG. 5.

First, an upper surface layer of the silicon substrate 10 is thermally oxidized thereby forming the silicon oxide film 11 at Step S202. The silicon oxide film 11 serves as a tunnel oxide film of the charge trap memory 101 in the memory area 21.

Next, the silicon nitride film 12 is deposited on the silicon oxide film 11 by a CVD method at Step S204. The silicon nitride film 12 serves as the charge trap film of the charge trap memory 101 in the memory area 21.

Next, the aluminum oxide film 13 is deposited on the silicon nitride film 12 by a CVD method at Step S206. The aluminum oxide film 13 serves as a blocking insulation film of the charge trap memory 101 in the memory area 21.

Next, a photoresist pattern is formed on the aluminum oxide film 13 at Step S208. Specifically, a photoresist is applied to an upper surface of the aluminum oxide film 13, thereby forming a photoresist film (not shown) on the aluminum oxide film 13. Then, the photoresist film is exposed to exposure light through a photomask (not shown) in an exposure apparatus (not shown). The photoresist pattern has an opening corresponding to the temperature sensor area 22, and covers the memory area 21.

Next, oxygen is injected to the aluminum oxide film 13 exposed through the opening of the photoresist film (or the aluminum oxide film 13 in the temperature sensor area 22). The oxygen injection may be carried out by ion-implanting oxygen ions into the aluminum oxide film 13, employing an ion implantation apparatus, or by irradiating oxygen gas clusters onto the aluminum oxide film 13, employing a gas cluster ion beam apparatus.

With this step (S210), oxygen injected to the aluminum oxide film 13 in the temperature sensor area 22, and oxygen is not injected to the aluminum oxide film 13 in the memory area 21.

Next, the electrode 14 is formed on the aluminum oxide film 13 at Step S212. The electrode 14 is composed of a TiN film and a W film in this embodiment. The electrode 14 serves as a gate electrode of the charge trap memory 101 in the memory area 21.

Incidentally, the silicon nitride film 12 is not necessarily deposited on the silicon oxide film 11 as stated above. In this case, the aluminum oxide film 13 is deposited on the silicon oxide film 11 at step S206, without performing step S204.

In such a manner, the temperature sensor 100 according to the first embodiment is manufactured.

Incidentally, a thermal process may be performed after the oxygen injection step (S210), thereby to anneal the oxygen injected aluminum oxide film 13. In this case, an annealing temperature needs to be less than 500° C., because the oxygen injected aluminum oxide film 13 that is annealed at 500° C. or greater does not present the relationship shown in FIG. 2, as stated above. Alternatively, the thermal process, if necessary, may be performed so that a temperature in the temperature sensor area 22 does not become 500° C. or greater.

With these procedures, the temperature sensor 100 according to the first embodiment is manufactured. According to the semiconductor device 20 of this embodiment, because the temperature sensor 100 (FIG. 1) has a similar structure as the charge trap memory 101, the semiconductor device 20 in which the temperature sensor 100 coexists with the charge trap memory 101 can be manufactured without employing other processes for integrating the temperature sensor 100 into the charge trap memory 101, or without using any special materials.

Third Embodiment

Next, a method of controlling temperature according to a third embodiment of the present invention is explained, taking an example where the semiconductor device 20 according to the second embodiment is used.

(Temperature Control of a Semiconductor Device 1)

When a temperature of the semiconductor device 20 according to the second embodiment becomes higher, data stored in the memory area 21 may be deleted. To prevent such a problem, the temperature of the semiconductor device 20 may be cooled, or the data may be transferred to other memory devices.

Figure 6:
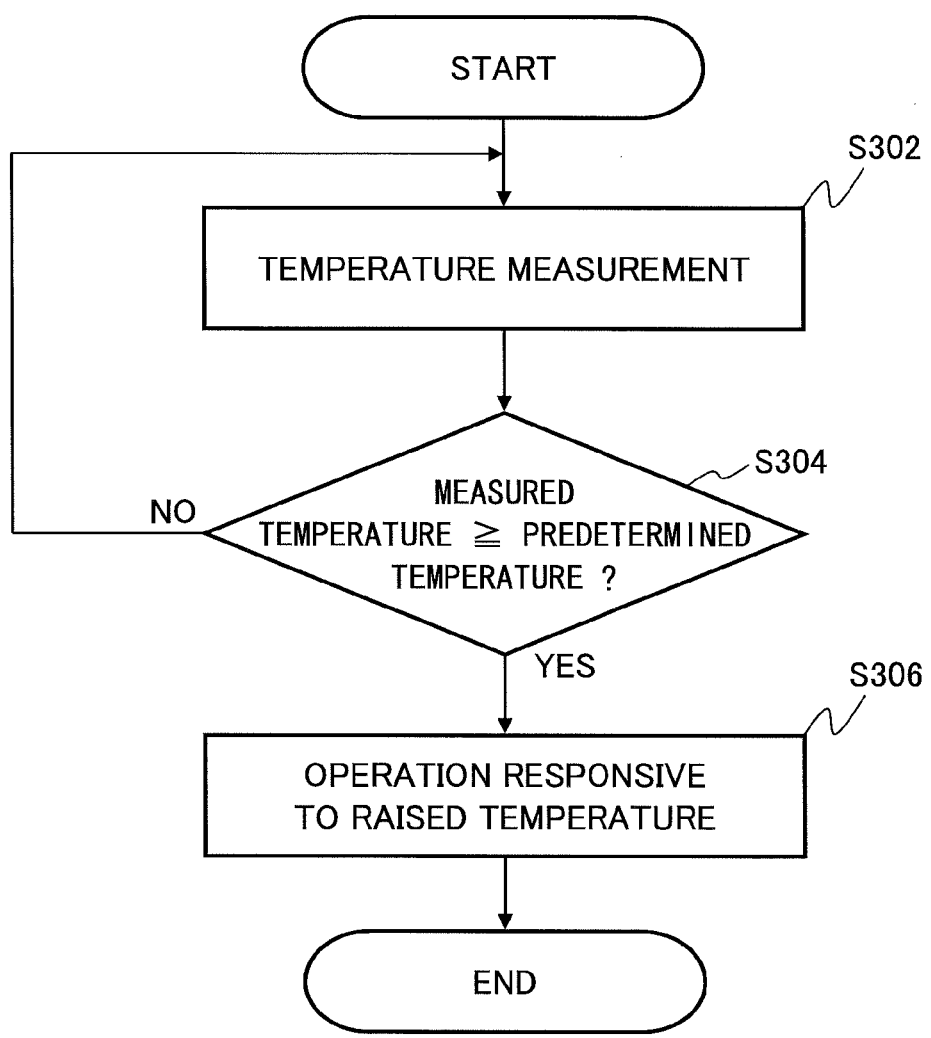
FIG. 6 is a flowchart illustrating a method of controlling a semiconductor device according to a third embodiment.

Referring to FIG. 6, a temperature is measured by the temperature sensor 100 (FIG. 1) in the temperature sensor area 22 of the semiconductor device 20 at Step S302.

Next, it is determined at Step S304 whether the temperature measured by the temperature sensor 100 of the temperature sensor area 22 at Step S302 is a predetermined temperature or greater. When the measured temperature is the predetermined temperature or greater (Step S304: YES), the procedure proceeds to Step S306; and when the measured temperature is less than the predetermined temperature (Step S304: NO), the procedure proceeds to Step S302, where the temperature is measured again by the temperature sensor 100 (FIG. 1).

At Step S306, an operation responsive to the raised temperature is performed. Specifically, because the temperature of the semiconductor device 20 becomes the predetermined temperature or greater, a cooling apparatus such as a fan may be used to cool the semiconductor device 20, or the data stored in the memory area 21 may be transferred.

With these procedures, the data stored in the memory area 21 of the semiconductor 20 are prevented from being lost.

(Temperature Control of a Semiconductor Device 2)

In a semiconductor device such as a charge trap memory, writing performance is also changed depending on a temperature of the semiconductor device. Therefore, it is important to write data into the semiconductor device at writing conditions depending on the temperature.

Figure 7:
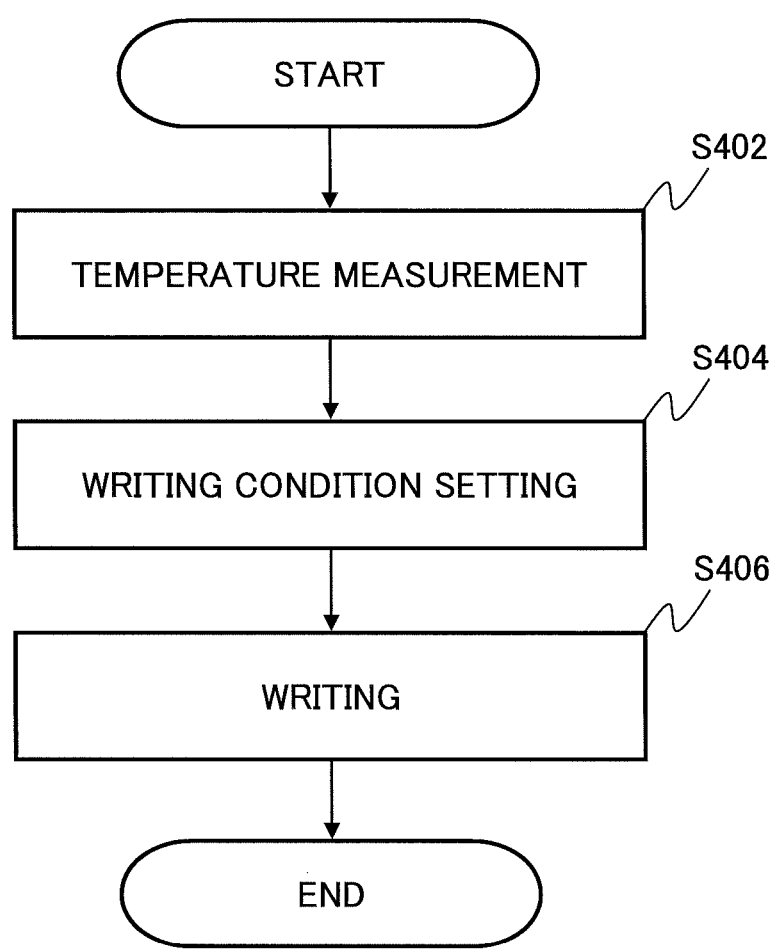
FIG. 7 is another flowchart illustrating another method of controlling a semiconductor device according to a third embodiment.

Referring to FIG. 7, a temperature is measured by the temperature sensor 100 (FIG. 1) in the temperature sensor area 22 of the semiconductor device 20 at Step S402.

Next, at Step S404, a writing condition according to which data are written into the charge trap memory 101 in the memory area 21 is determined in accordance with the temperature measured by the temperature sensor 100 in the temperature area 22 at Step S402.

Next, the data are written into the charge trap memory 101 in the memory area 22 according to the writing condition determined at Step S404. The writing condition may include a pulse width or a voltage, or both, of a signal applied to the charge trap memory 101.

With these procedures, the data can be written with high reliability into the charge trap memory 101 in the memory area 21.

Although the invention has been described in conjunction with the foregoing specific embodiments, various alternatives, variations and modifications will be apparent to those of ordinary skill in the art. Those alternatives, variations and modifications are intended to fall within the spirit and scope of the appended claims.

For example, although the charge trap memory 101 is formed in the semiconductor element area 21 in the second embodiment, another semiconductor element may be formed in the semiconductor element area 21. Even in this case, the semiconductor device 20 in which the temperature sensor 100 coexists with the other semiconductor element can be manufactured without using any special materials.

What is claimed is:

1. A temperature sensor comprising:
   a charge trap structure including
      a silicon oxide film formed on a substrate;
      an aluminum oxide film that is formed on the silicon oxide film, wherein oxygen is injected into the aluminum oxide film from an upper surface thereof; and
      an electrode formed on the aluminum oxide film,
   wherein a flat band voltage of the charge trap structure is temperature dependent.

2. The temperature sensor according to claim 1, wherein the charge trap structure further includes a silicon nitride film between the silicon oxide film and the aluminum oxide film.

3. A method of manufacturing a temperature sensor comprising steps of:
   forming a silicon oxide film on a substrate;
   forming an aluminum oxide film on the silicon oxide film;
   injecting oxygen into the aluminum oxide film from an upper surface thereof; and
   forming an electrode on the aluminum oxide film to which the oxygen has been injected.

4. The method according to claim 3, wherein the aluminum oxide film is exposed to an oxygen gas cluster beam in the step of injecting oxygen.

5. The method according to claim 3, further comprising a step of forming a silicon nitride film between the step of forming the silicon oxide film and the step of forming the aluminum oxide film.

6. A semiconductor device comprising:
   a semiconductor element area where a semiconductor element is formed, wherein the semiconductor element includes
      a charge trap structure including
      a silicon oxide film formed on a substrate;
      an aluminum oxide film that is formed on the silicon oxide film, wherein oxygen is injected into the aluminum oxide film from an upper surface thereof; and
      an electrode formed on the aluminum oxide film, and
   a temperature sensor area where the temperature sensor according to claim 1 is formed.

7. The semiconductor device according to claim 6, wherein a charge trap memory is formed in the semiconductor element area.

8. The semiconductor device according to claim 7, wherein the charge trap memory further includes a silicon nitride film between the silicon oxide film and the aluminum oxide film.

9. The semiconductor device according to claim 6, wherein the temperature sensor includes a silicon nitride film between the silicon oxide film and the aluminum oxide film.

10. A method of manufacturing a semiconductor device according to claim 6, the method comprising steps of:
    forming a silicon oxide film on a substrate;
    forming an aluminum oxide film on the silicon oxide film;
    injecting oxygen selectively into the aluminum oxide film in the temperature sensor area; and
    forming an electrode on the aluminum oxide film in the temperature sensor area and the semiconductor element area.

11. The method according to claim 10, wherein the aluminum oxide film is exposed to an oxygen gas cluster beam in the step of injecting oxygen.

12. The semiconductor device according to claim 10, wherein a charge trap memory is formed in the semiconductor element area.

13. The method according to claim 10, further comprising a step of forming a silicon nitride film between the step of forming the silicon oxide film and the step of forming the aluminum oxide film.

14. A method of controlling a semiconductor device according to claim 6, the method comprising steps of:
   measuring a temperature in the temperature sensor area;
   determining whether the measured temperature is a predetermined temperature or greater; and
   performing one of cooling the semiconductor device and transferring data stored in the memory area of the semiconductor device to another device when it is determined that the measured temperature is the predetermined temperature or greater in the step of determining.

15. The method according to claim 14, wherein a charge trap memory is formed in the semiconductor element area.

16. The method according to claim 14, wherein a silicon nitride film is formed between the silicon oxide film and the aluminum oxide film.

17. A method of controlling the semiconductor device according to claim 6, the method comprising steps of:
   measuring a temperature in the temperature sensor area;
   determining one of a pulse width and a voltage of a signal applied to the semiconductor element area in accordance with the measured temperature; and
   writing data into the semiconductor element area in accordance with one of the pulse width and the voltage determined in the step of determining.

18. The method according to claim 17, wherein a charge trap memory is formed in the semiconductor element area.

19. The method according to claim 17, wherein a silicon nitride film is formed between the silicon oxide film and the aluminum oxide film.

* * * * *